A. LE BLANC.
ELECTROLYTIC RECTIFIER.
APPLICATION FILED APR. 12, 1913.

1,165,983.

Patented Dec. 28, 1915.

WITNESSES
RJ Dearborn
G. R. Quimby

INVENTOR
Alexis LeBlanc
BY
E. W. Marshall
ATTORNEY

UNITED STATES PATENT OFFICE.

ALEXIS LE BLANC, OF NEW YORK, N. Y., ASSIGNOR TO GURNEY ELECTRIC ELEVATOR COMPANY, OF HONESDALE, PENNSYLVANIA, A CORPORATION OF PENNSYLVANIA.

ELECTROLYTIC RECTIFIER.

1,165,983.   Specification of Letters Patent.   Patented Dec. 28, 1915.

Application filed April 12, 1913. Serial No. 760,642.

*To all whom it may concern:*

Be it known that I, ALEXIS LE BLANC, a citizen of the United States, and a resident of the city, county and State of New York, have invented certain new and useful Improvements in Electrolytic Rectifiers, of which the following is a specification, reference being had to the accompanying drawings, forming a part thereof.

My invention relates to electric apparatus for transforming alternating current to unidirectional current and has special reference to those which are known as electrolytic rectifiers.

One object of my invention is to provide a device of the character above indicated, that shall be simple and inexpensive to construct and efficient and reliable in operation.

Other objects of my invention will be pointed out hereinafter.

I will describe my invention in the following specification and point out the novel features thereof in appended claims.

Figure 1:
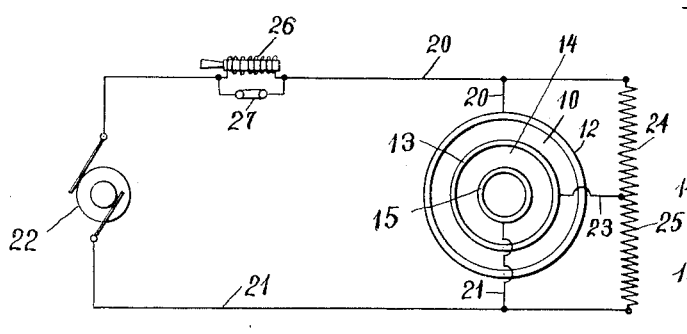
Figure 3:
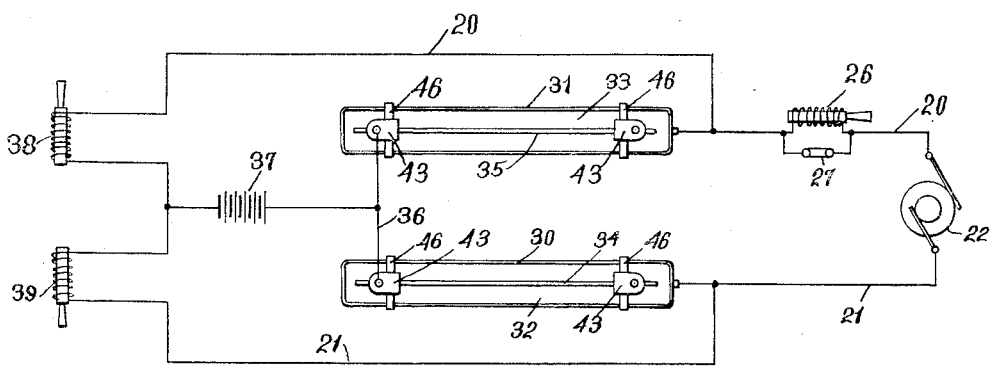
Figure 4:
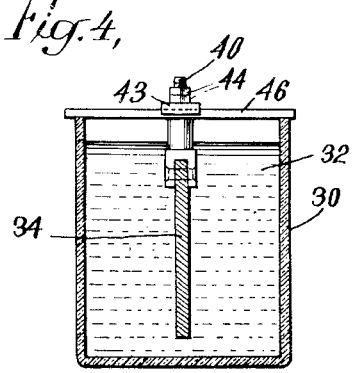
Figure 5:
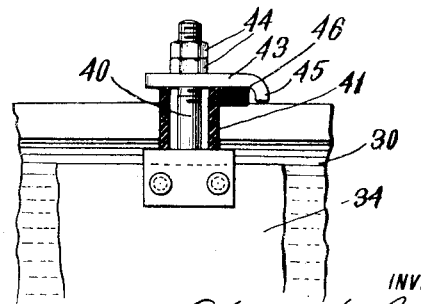

Referring to the drawings: Figure 1 is a diagrammatic view of an electric distributing system embodying my invention, the rectifier being shown in plan. The rectifier is shown in sectional elevation in Fig. 2. Fig. 3 is a view corresponding to Fig. 1 of a system embodying a modified rectifier structure which is also constructed and arranged in accordance with my invention. Fig. 4 is a transverse sectional elevation on a larger scale of one of the members of the rectifier of Fig. 3. A detail view on a still larger scale is shown in Fig. 5.

Like characters of reference designate corresponding parts in all the figures.

Figure 2:
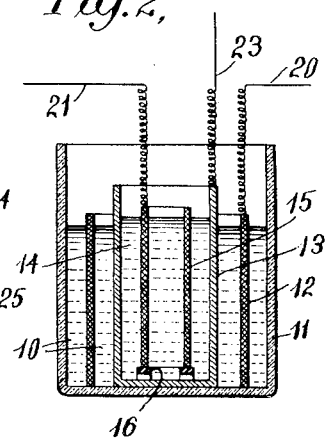

With special reference to Figs. 1 and 2, a body 10 of liquid electrolyte is contained in any suitable vessel as for example a glass jar 11.

A lead plate 12 which is bent into the form of a hollow cylinder or tube is set in the jar on end and is partially submerged in the electrolyte.

Within the cylindrical plate is a cup 13 of aluminum which contains an independent body 14 of electrolyte and is substantially concentric with the lead cylinder 12.

A second tubular lead plate 15 is disposed within the cup 13 and is supported and held out of contact with the cup by an insulating block 16. It is partially submerged in the body 14 of electrolyte.

The plates 12 and 15 may be made of any suitable material unlike that of the cup 13. While I prefer to make the cup of aluminum, any other substance capable of acting in the well known capacity of an electrolytic valve may be employed.

It is of course essential to keep the three plates 12, 13 and 15 out of contact with each other and insulating spacers (not shown) may be employed if desired. It is also essential to keep the two bodies 10 and 14 of electrolyte separate. To accomplish this, however, it is only necessary to extend the walls of the cup above the level of the liquid in the jar 11 and to avoid filling the cup completely.

The electrolyte may consist of a solution of ammonium phosphate or some other suitable liquid.

Referring specially to the diagram of Fig. 1, the lead plates 12 and 15 are respectively connected to alternating current circuit conductors 20 and 21, which are supplied with energy from any suitable source such as a generator 22. A conductor 23 is connected to the aluminum plate 13 and constitutes a positive line conductor of a direct current circuit which may be completed either through the conductor 20 or the conductor 21. As shown in the diagram, translating devices 24 and 25 are connected across these circuits. These devices may be two coils of a lifting magnet or otherwise magnetically associated or they may constitute two independent loads of equal or unequal capacities.

I have shown an adjustable inductive resistance 26 included in the line conductor 20 but this may or may not be used, a switch 27 being arranged to short circuit it.

While I do not intend to be limited by any theory of operation, I believe the operation of the apparatus is as follows: A valvular film is formed on the surface of the aluminum and while it permits current to flow inward to the plate it precludes current flowing outward therethrough. Assuming that at a predetermined instant the conductor 21 is positive (+) and the conductor 20 negative (−), current then flows from the lead plate 15 through the electrolyte 14 to the aluminum plate thence through conductor 23 and translating device 24 to conductor 20, current being prevented from going directly to the conductor 20 through the electrolyte 10. When the polarity is reversed, current flows from the conductor 20 and lead plate 12 through electrolyte 10 to the aluminum plate 13 thence through conductor 23 and translating device 25 to conductor 21. Thus unidirectional current is supplied to the translating devices. If these devices are a part of the same lifting magnet the magnetic flux is maintained substantially constant and the result closely approximates that produced by a uniformly continuous current. In fact the current delivered from the rectifier is sufficiently continuous to satisfactorily operate independent translating devices such for example as an ordinary direct current motor and a lifting magnet. The self induction of a translating device like a lifting magnet which has a coil or winding associated with an iron core maintains a substantially constant direct magnetic flux which reacts upon the electromotive force and holds it substantially constant although it is only connected in one branch of the direct current circuit of the rectifier.

I have used the term "plate" broadly and without limiting these parts to any particular shape.

By separating the electrolyte into two bodies I am able to utilize a single aluminum plate instead of two, as has always hitherto been considered essential, and furthermore, as evidenced from the embodiment of the invention illustrated in Figs. 1 and 2, the structure may be made very simple and compact.

In the arrangement of Figs. 3 to 5 inclusive, two similar tanks 30 and 31 replace the single jar 11 of Figs. 1 and 2. In the tanks, which are preferably lead or some other suitable electrode material, are contained bodies 32 and 33 of electrolyte in which are suspended aluminum plates 34 and 35. The two plates are interconnected electrically by a conductor 36 constituting one terminal of a direct current circuit which as shown, may be used for charging a battery 37. The lead tanks are respectively connected to the alternating current supply circuit conductors 20 and 21 and the opposite terminal of the battery is connected to both of these circuit conductors through adjustable inductive resistances 38 and 39. In order that the electrolyte may not come into contact with the aluminum plates at its surface, screw-threaded studs 40 are secured to each plate and extend upwardly from the upper edge of the plate through an insulating bushing or sleeve 41. The sleeve is clamped against a shoulder 42 of the stud by a cap washer 43 and nuts 44 as shown in Fig. 5. Each washer has a projection 45 which hooks over an insulating rod 46 and thus the plates are suspended in the tanks. The depth of the electrolyte is such that the surface of each of the liquid bodies 33 and 34 is above the upper edge of the plate and engages the insulating sleeve. By this means arcing at the surface of the electrolyte is avoided and the efficiency of the apparatus enhanced. The two interconnected aluminum plates correspond to the single plate 13 of Figs. 1 and 2, the operation of the two rectifiers being alike.

Variations may be effected within the spirit and scope of my invention.

What I claim is:

1. A rectifier comprising a metal plate having an electrolytic valvular film on its surface, two independent bodies of electrolyte in contact with different surfaces of the plate and plates which are unlike the aforesaid metal plate, respectively located in the two bodies of electrolyte.

2. A rectifier comprising a receptacle having an electrolytic valvular film on its surface, a body of electrolyte in the receptacle, an independent body of electrolyte in contact with the outer surface of the receptacle and plates of unlike material from the receptacle, located in the respective bodies of electrolyte.

3. A rectifier comprising two independent bodies of electrolyte, an aluminum plate separating the bodies and plates of an unlike material in the respective bodies of electrolyte.

4. A rectifier comprising an aluminum cup, a body of electrolyte contained therein, an independent body of electrolyte around the cup in contact with its exterior and plates of an unlike material from the cup, located in the respective bodies of electrolyte.

5. A rectifier comprising an outer receptacle, a body of electrolyte therein, an inner receptacle of aluminum, an independent body of electrolyte therein and a pair of plates of material other than aluminum located in the respective independent bodies of electrolyte.

6. A rectifier comprising an outer receptacle, a body of electrolyte therein, an inner receptacle of aluminum, an independent body of electrolyte therein and a pair of plates of material other than aluminum located respectively in the independent bodies of electrolyte and only connected electrically to the aluminum by the bodies of electrolyte in which they are disposed.

7. A rectifier comprising an outer receptacle, a body of electrolyte contained therein, a hollow cylindrical plate in the electrolyte, a cylindrical cup concentrically disposed within the hollow plate, an independent body of electrolyte in the cup and a second plate in the body of electrolyte in the cup.

8. A rectifier comprising an outer receptacle, a body of electrolyte contained therein, a hollow cylindrical plate in the electrolyte, a cylindrical cup concentrically disposed within the hollow plate, an independent body of electrolyte in the cup and a second plate in the body of electrolyte in the cup, said plates being connected electrically with the cup only through the bodies of electrolyte in which they are located.

9. The combination with a source of alternating current energy, two independent bodies of electrolyte an aluminum plate separating the bodies and a pair of plates of unlike material respectively connected with the terminals of the alternating current source of energy and respectively disposed in the bodies of electrolyte.

10. The combination with a source of alternating current energy, two independent bodies of electrolyte an aluminum plate separating the bodies and a pair of plates of unlike material respectively connected with the terminals of the alternating current source of energy and respectively disposed in the bodies of electrolyte, and a direct current supply circuit conductor connected with the aluminum plate.

11. The combination with a source of alternating current energy, two independent bodies of electrolyte, an aluminum plate separating the bodies and a pair of plates of unlike material respectively connected with the terminals of the alternating current source of energy and respectively disposed in the bodies of electrolyte, and a direct current supply circuit conductor connected with the aluminum plate, the direct current circuit being completed to either of the terminals of the alternating current source.

12. The combination with a source of alternating current energy, two independent bodies of electrolyte an aluminum plate separating the bodies and a pair of plates of unlike material respectively connected with the terminals of the alternating current source of energy and respectively disposed in the bodies of electrolyte, a direct current supply circuit conductor connected with the aluminum plate and an inductive translating device connected between said direct current conductor and one terminal of said alternating current source.

In witness whereof, I have hereunto set my hand this 10th day of April in the year 1913.

ALEXIS LE BLANC.

Witnesses:
C. R. CALLAWAY,
W. W. CUMMISKEY.

Copies of this patent may be obtained for five cents each, by addressing the "Commissioner of Patents, Washington, D. C."